United States Patent
Tuller et al.

(10) Patent No.: US 12,337,840 B2
(45) Date of Patent: Jun. 24, 2025

(54) USE OF TRIANGULAR NUMBERS IN CALCULATION OF JERK LIMITED SPEED PROFILE FOR DETERMINATION OF TARGET SPEEDS AND FEED-FORWARD TORQUE FOR SPEED CONTROLLER

(71) Applicants: Zachary L Tuller, Grand Rapids, MI (US); Nadirsh Patel, Farmington Hills, MI (US); Allwyn D Bhakare, Windsor (CA); Naresh Sathyamoorthy, Chennai (IN); Andy M Lee, Clawson, MI (US)

(72) Inventors: Zachary L Tuller, Grand Rapids, MI (US); Nadirsh Patel, Farmington Hills, MI (US); Allwyn D Bhakare, Windsor (CA); Naresh Sathyamoorthy, Chennai (IN); Andy M Lee, Clawson, MI (US)

(73) Assignee: FCA US LLC, Auburn Hills, MI (US)

( * ) Notice: Subject to any disclaimer, the term of this patent is extended or adjusted under 35 U.S.C. 154(b) by 341 days.

(21) Appl. No.: 17/869,421

(22) Filed: Jul. 20, 2022

(65) Prior Publication Data

US 2024/0025407 A1    Jan. 25, 2024

(51) Int. Cl.
*B60W 10/08*  (2006.01)
*B60W 10/12*  (2012.01)
*B60W 30/16*  (2020.01)
*B60W 40/10*  (2012.01)
*B60W 40/107*  (2012.01)

(52) U.S. Cl.
CPC .......... *B60W 30/162* (2013.01); *B60W 10/12* (2013.01); *B60W 40/107* (2013.01)

(58) Field of Classification Search
CPC .............. B60W 40/107; B60W 10/12; B60W 50/0098; B60W 20/15; B60W 50/06; B60W 10/08; B60W 30/162; B60W 2050/0008; B60W 2710/083; B60W 2710/081; B60K 6/485; Y02T 10/62
See application file for complete search history.

(56) References Cited

U.S. PATENT DOCUMENTS

| | | | |
|---|---|---|---|
| 2011/0178662 A1* | 7/2011 | Sime ...................... | B60K 6/445 701/22 |
| 2017/0313299 A1* | 11/2017 | Yun ....................... | B60W 20/15 |
| 2020/0269702 A1 | 8/2020 | Meyer et al. | |
| 2020/0377093 A1* | 12/2020 | Akiya ................... | B60W 30/18 |
| 2021/0053553 A1* | 2/2021 | Akanda ................. | B60W 20/11 |
| 2021/0215211 A1* | 7/2021 | Ravichandran ......... | F16D 48/10 |

* cited by examiner

*Primary Examiner* — Stephen Holwerda
(74) *Attorney, Agent, or Firm* — Jeremy J. Klobucar (57) ABSTRACT

Speed control techniques include, based on a set of target speed inputs indicative a target speed for an electric motor, determining a set of profiling inputs including (i) the target speed and (ii) a set of desired acceleration calibrations, performing jerk-based profiling based on the set of profiling inputs to determine at least one of an open-loop acceleration command and a profiled target speed, determining a closed-loop torque adjustment based on the profiled target speed and a measured speed of the electric motor, determining an electric motor torque command based on the open-loop acceleration command and the closed-loop torque adjustment, and controlling the electric motor based on the respective electric motor torque command to improve vehicle responsiveness in reaching the target speed.

20 Claims, 5 Drawing Sheets

USE OF TRIANGULAR NUMBERS IN CALCULATION OF JERK LIMITED SPEED PROFILE FOR DETERMINATION OF TARGET SPEEDS AND FEED-FORWARD TORQUE FOR SPEED CONTROLLER

FIELD

The present application generally relates to hybrid powertrain control and, more particularly, to techniques for software-based controls capable of both smooth convergence to and quickly achieving of a target speed/position.

BACKGROUND

In hybrid powertrains (e.g., an engine plus one or more electric motors), a hybrid controller or hybrid control processor (HCP) is typically in charge of engine speed control by controlling the electric motor(s) and the engine to achieve engine speed control. The hybrid controller determines target speeds and torque commands for the engine and motor sub-controllers. The hybrid controller coordinates this speed control between an open-loop feed-forward component and a closed-loop feedback component, also known as "profiling" the target speed to determine an observer component. The profiled speed is intended to be a smoothed target that is achievable at any moment in time by the open-loop contribution of the electric motor(s) and/or the engine.

By taking the derivative of this speed profile at each step, an instantaneous acceleration to achieve the speed profile is obtained. This acceleration is then converted to a torque command for the electric motor(s) and/or the engine by multiplication by a system inertia derived constant. Errors in achieving the profiled speed at each moment are then handled by the closed-loop control to modify the torque command(s) to better achieve the profiled speed. Conventional hybrid powertrain speed control techniques suffer from torque slew limits and insufficient (slow) convergence when the target speed is changing. Accordingly, while such conventional techniques do work for their intended purpose, there exists an opportunity for improvement in the relevant art.

SUMMARY

According to one example aspect of the invention, a speed control system for a vehicle having a powertrain including an electric motor is presented. In one exemplary implementation, the speed control system comprises a set of sensors that measure a set of system inputs including (i) a measured speed of the electric motor and (ii) a set of target speed inputs indicative of a target speed for the electric motor and a controller configured to perform a speed control technique including based on at least the set of target speed inputs, determine a set of profiling inputs including (i) the target speed and (ii) a set of desired acceleration calibrations, based on the set of profiling inputs, perform jerk-based profiling to determine at least one of an open-loop acceleration command and a profiled target speed, based on the profiled target speed and the measured electric motor speed, determine a closed-loop torque adjustment, and based on the open-loop acceleration command and the closed-loop torque adjustment, determine an electric motor torque command, and control the electric motor based on the respective torque command to improve vehicle responsiveness in reaching the target speed.

In some implementations, the controller is further configured to perform the jerk-based profiling to determine the open-loop acceleration command (A) as follows:

$$A = \frac{N_{tgt} - N_{prof\_prev} - \dot{N}_{tgt} \times dT}{LTC \times dT} + \dot{N}_{tgt} - \frac{J(LTC-1) \times dT}{2},$$

where $N_{tgt}$ represents the target speed, which is dynamically changing, $\dot{N}_{tgt}$ represents the change in the target speed, $N_{prof\_prev}$ represents a previously profiled target speed, LTC represents a number of loops to converge (LTC) or the profiled target speed, J represents the jerk limits, and t represents time or a product of LTC and a time step (dT). In some implementations, the controller is further configured to perform the jerk-based profiling to determine the LTC or the profiled target speed as follows:

$$LTC = \max\left(1, \left\lceil \frac{1}{2}\left(\sqrt{8\left|\frac{N_{tgt} - N_{prof\_prev} - \dot{N}_{tgt} \times dT}{J \times dT \times dT}\right| + 1} - 1\right)\right\rceil\right).$$

In some implementations, the controller is configured to perform the speed control technique continuously during electric motor operation and at any point in time. In some implementations, the controller is configured to utilize a closed-loop speed observer to determine the closed-loop torque adjustment based on the profiled target speed and the measured electric motor speed. In some implementations, the target speed is a dynamically changing target speed and not a stationary target speed. In some implementations, the speed control technique is entirely software-based and executable by the controller and does not require any additional vehicle hardware.

In some implementations, the powertrain is a hybrid powertrain comprising a non-electrically variable (non-EVT) transmission having an input shaft connected to a crankshaft of an engine and an output shaft connected to a first axle of a drivetrain of the vehicle, the set of system inputs includes (i) at least one of the measured speed of the electric motor and a measured speed of the engine and (ii) the set of target speed inputs are indicative of a target speed for the engine, and the controller is configured to perform the speed control technique including based on at least the set of target speed inputs, determine the set of profiling inputs including (i) the target engine speed and (ii) the set of desired acceleration calibrations, based on the open-loop acceleration command and the closed-loop torque adjustment, determine engine and electric motor torque commands, and control at least one of the engine and the electric motor based on the respective torque commands to improve vehicle responsiveness in reaching the target engine speed.

In some implementations, the hybrid powertrain comprises a first electric motor and a second electric motor, the first electric motor is connected to the crankshaft of the engine via a belt tensioner, and the second electric motor is connected directly to the non-EVT transmission and not to the engine. In some implementations, the hybrid powertrain comprises a first electric motor and a second electric motor, the first electric motor is connected to the crankshaft of the engine via a belt tensioner, and the second electric motor is connected directly to a different second axle of the drivetrain of the vehicle and not to the non-EVT transmission or the engine.

According to another example aspect of the invention, a speed control method for a vehicle having a powertrain including an electric motor is presented. In one exemplary implementation, the speed control method comprises receiving, by a controller and from a set of sensors, a measured set of system inputs including (i) a measured speed the electric motor and (ii) a set of target speed inputs indicative a target speed for the electric motor and performing, by the controller, a speed control technique including based on at least the set of target speed inputs, determining a set of profiling inputs including (i) the target speed and (ii) a set of desired acceleration calibrations, based on the set of profiling inputs, performing jerk-based profiling to determine at least one of an open-loop acceleration command and a profiled target speed, based on the profiled target speed and the measured electric motor speed, determining a closed-loop torque adjustment, based on the open-loop acceleration command and the closed-loop torque adjustment, determining an electric motor torque command, and controlling the electric motor based on the respective electric motor torque command to improve vehicle responsiveness in reaching the target speed.

In some implementations, the jerk-based profiling to determine the open-loop acceleration command (A) is performed by the controller as follows:

$$A = \frac{N_{tgt} - N_{prof\_prev} - \dot{N}_{tgt} \times dT}{LTC \times dT} + \dot{N}_{tgt} - \frac{J(LTC - 1) \times dT}{2},$$

where $N_{tgt}$ represents the target speed, which is dynamically changing, $\dot{N}_{tgt}$ represents the change in the target speed, $N_{prof\_prev}$ represents a previously profiled target speed, LTC represents a number of loops to converge (LTC) or the profiled target speed, J represents the jerk limits, and t represents time or a product of LTC and a time step (dT). In some implementations, the jerk-based profiling to determine the LTC or the profiled target speed is performed by the controller as follows:

$$LTC = \max\left(1, \left\lceil \frac{1}{2}\left(\sqrt{8\left|\frac{N_{tgt} - N_{prof\_prev} - \dot{N}_{tgt} \times dT}{J \times dT \times dT}\right| + 1} - 1\right)\right\rceil\right).$$

In some implementations, the speed control technique is performed by the controller continuously during electric motor operation and at any point in time. In some implementations, a closed-loop speed observer is utilized by the controller to determine the closed-loop torque adjustment based on the profiled target speed and the measured electric motor speed. In some implementations, the target speed is a dynamically changing target speed and not a stationary target speed. In some implementations, the speed control technique is entirely software-based and executable by the controller and does not require any additional vehicle hardware.

In some implementations, the powertrain is a hybrid powertrain comprising a non-electrically variable (non-EVT) transmission having an input shaft connected to a crankshaft of an engine and an output shaft connected to a first axle of a drivetrain of the vehicle, the set of system inputs includes (i) at least one of the measured speed of the electric motor and a measured speed of the engine and (ii) the set of target speed inputs are indicative of a target speed for the engine, and the speed control technique includes based on at least the set of target speed inputs, determine the set of profiling inputs including (i) the target engine speed and (ii) the set of desired acceleration calibrations, based on the open-loop acceleration command and the closed-loop torque adjustment, determine engine and electric motor torque commands, and control at least one of the engine and the electric motor based on the respective torque commands to improve vehicle responsiveness in reaching the target engine speed.

In some implementations, the hybrid powertrain comprises a first electric motor and a second electric motor, the first electric motor is connected to the crankshaft of the engine via a belt tensioner, and the second electric motor is connected directly to the non-EVT transmission and not to the engine. In some implementations, the hybrid powertrain comprises a first electric motor and a second electric motor, the first electric motor is connected to the crankshaft of the engine via a belt tensioner, and the second electric motor is connected directly to a different second axle of the drivetrain of the vehicle and not to the non-EVT transmission or the engine.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional hybrid powertrain speed control techniques suffer from torque slew limits and insufficient (slow) convergence when the target speed is changing. More specifically, limitations from belt tension hardware connecting one electric motor to the engine (e.g., for stop/start functionality) leads to torque slew limits. Further, with a hybrid powertrain configuration having a second electric motor that could be independently connected to the road surface (e.g., via a separate vehicle axle), connecting the engine to a conventional (non-electrically variable, or non-EVT) transmission, while vehicle and transmission input speed are rising aggressively, faster convergence on a dynamically changing (i.e., non-stationary) target speed is desired.

For example, conventional speed control techniques could require an EVT transmission (e.g., more complex/expensive than a conventional non-EVT transmission) and utilize limits based on the shape of a first-order filter or a square root function to achieve smooth electric motor speed convergence without regard to the speed of the convergence and that could be very far off (e.g., hundreds of revolutions per minute, or RPM) from dynamically changing target speeds. Thus, while such conventional techniques do work for their intended purpose, there exists an opportunity for improvement in the relevant art. Accordingly, improved hybrid powertrain speed control techniques are presented herein that are entirely software-based in a hybrid controller or hybrid control processor (HCP) and that quickly and smoothly achieve accurate target speed convergence for a variety of different hybrid powertrain configurations (series, parallel, etc.) with a conventional non-EVT transmission. Potential benefits include reduced costs (e.g., no additional hardware) and improved hybrid vehicle responsiveness.

While a conventional non-EVT transmission implementation is primarily discussed herein and could be a larger beneficiary of the techniques of the present disclosure, it will be appreciated that these are not limited to non-EVT transmission applications. More specifically, these techniques could be applicable to EVT transmission applications and/or a range-extended electrified vehicle (REEV) or series hybrid configuration, where, for example only, there isn't as much urgency to change the engine to a certain target speed because of the lack of a conventional non-EVT transmission. It will also be appreciated that the techniques of the present disclosure relate to not only target speed convergence, but also to convergence a target position using a constant acceleration strategy (e.g., using position/speed/acceleration instead of speed/acceleration/jerk).

Figure 1:
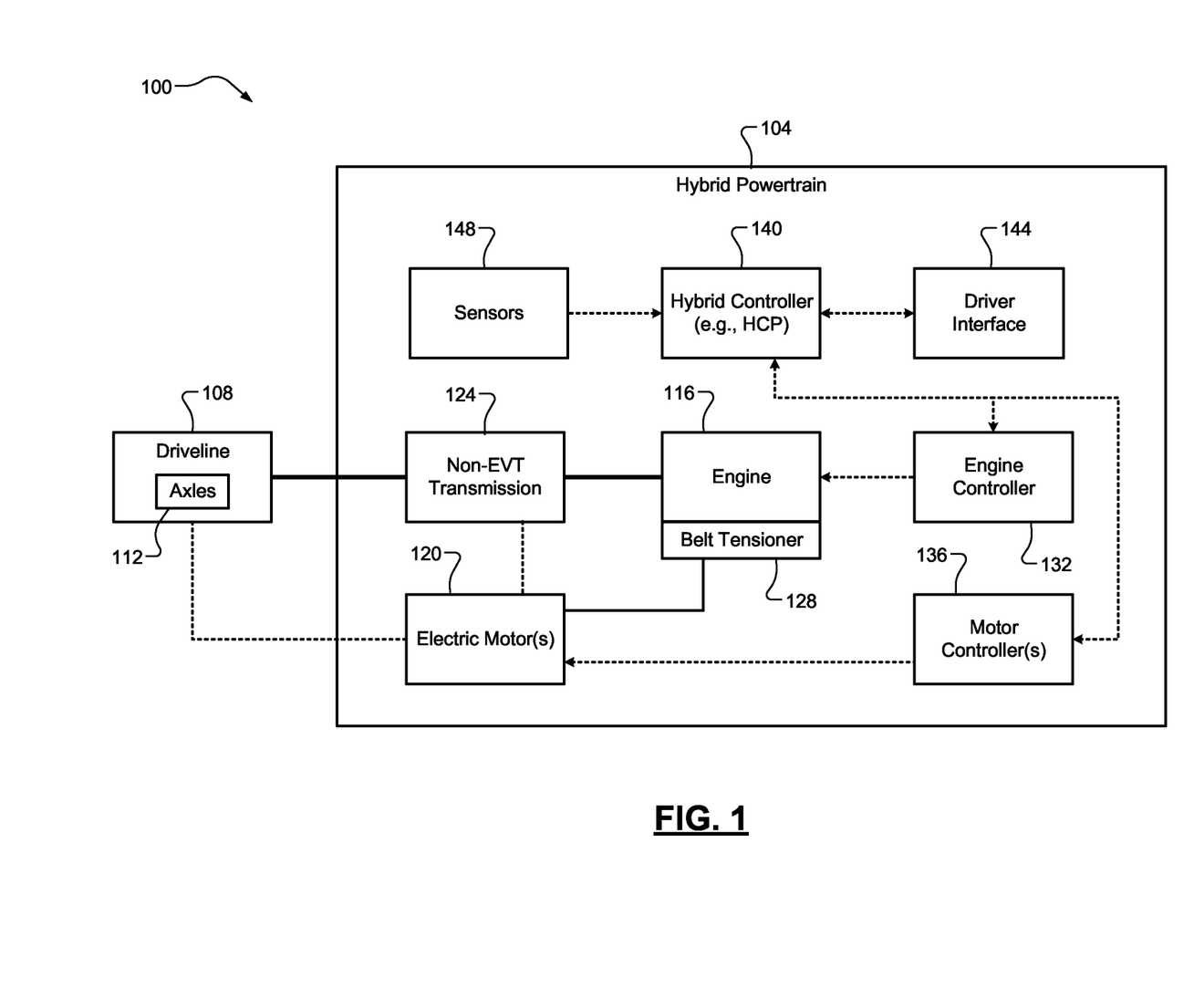
FIG. 1 is a functional block diagram of an example hybrid vehicle having an example hybrid powertrain according to the principles of the present application.

Referring now to FIG. 1, a functional block diagram of an example hybrid vehicle 100 having an example hybrid powertrain 104 according to the principles of the present application is illustrated. The hybrid powertrain 104 generally is configured to generate and transfer drive torque to a driveline 108 of the vehicle 100, with the driveline 108 having two (front/rear) axles 112. The hybrid powertrain 104 generally comprises an internal combustion engine 104 ("engine 104") that combusts a mixture of fuel (e.g., gasoline) and air to generate drive torque at a crankshaft (not shown) that is transferred to the driveline 108 via a conventional or non-EVT transmission 124 and at least one electric motor 120 configured to utilize electrical energy (e.g., current from a battery system, not shown) to generate drive torque. The engine 116 is controlled by a respective engine controller 132 and the electric motor(s) 120 are controlled by respective motor controller(s) 136. A hybrid controller 140 or HCP acts as a supervisory controller for the hybrid powertrain 104 and controls such to achieve a desired drive torque, such as to meet a driver torque request (from a driver interface 144, such as an accelerator pedal) and based on measured sensor parameters (e.g., rotational speeds of the engine 104 and/or electric motor(s) 120).

The hybrid powertrain 104 could have any suitable configuration (series, parallel, etc.). Two specific configurations of the hybrid powertrain 104 discussed herein and will now be described in greater detail. In a first configuration, the hybrid powertrain 104 comprises a first electric motor 120 coupled to the engine 104 (the crankshaft, not shown) via a belt tensioner 128 (e.g., for stop/start operation) and a second electric motor 120 being configured to directly and selectively provide drive torque to the non-EVT transmission 124. This is also known as a series configuration as the engine 116 and/or the electric motor(s) 120 could be providing drive torque to one of the axles 112 (e.g., a front axle) of the drivetrain 108 via the non-EVT transmission 124. In a second configuration, the hybrid powertrain 104 comprises the first electric motor coupled to the engine 104 (the crankshaft, not shown) via the belt tensioner 128 (e.g., for stop/start operation) and the second electric motor 120 being configured to directly and selectively provide drive torque to another one of the axles 112 (e.g., a rear axle) of the drivetrain 108 without the non-EVT transmission 124. This is also known as a parallel configuration and the second axle 112 (also referred to as an electronic or "e-axle") can achieve electric all-wheel drive (eAWD).

Figure 2:
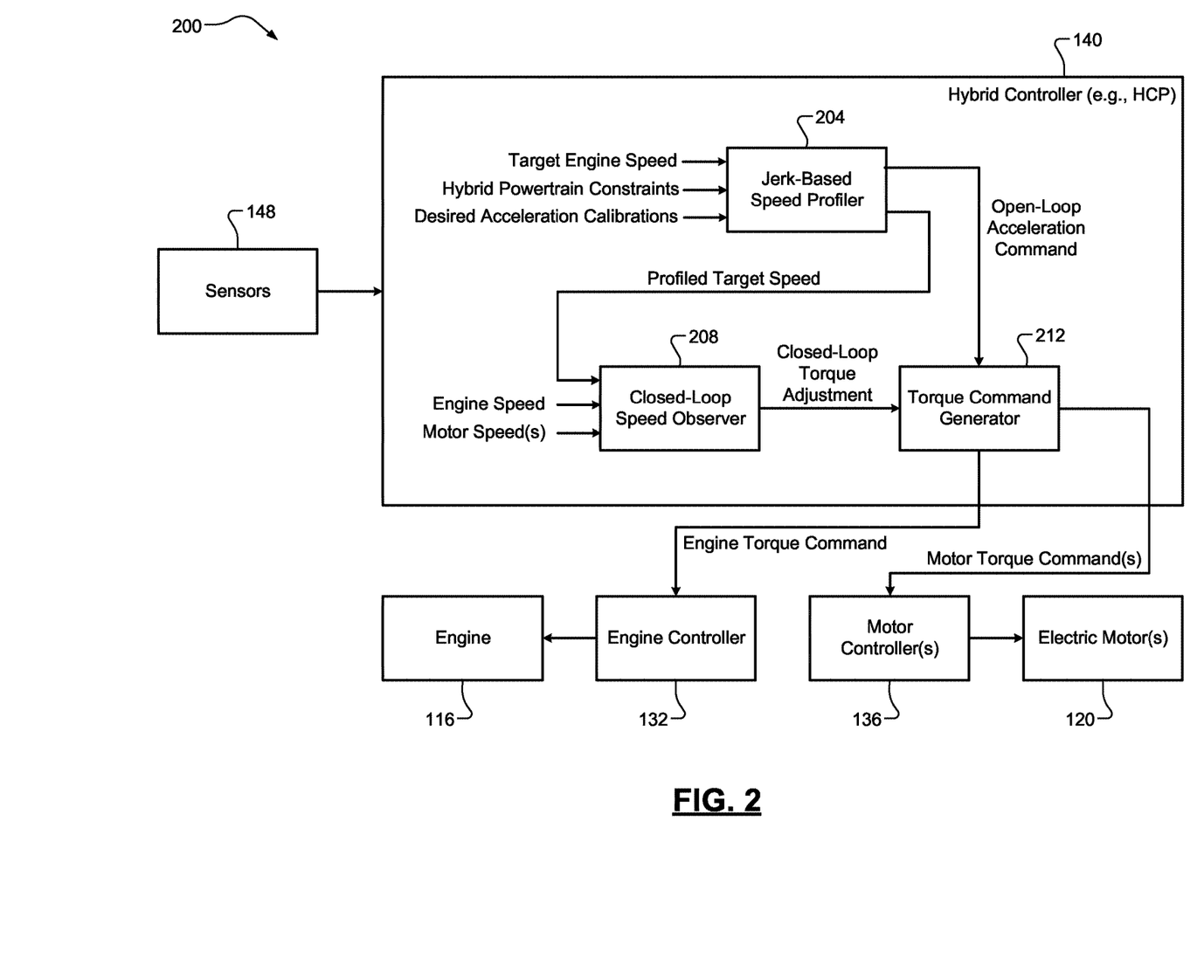
FIG. 2 is a functional block diagram of an example architecture of an example hybrid controller or hybrid control processor (HCP) according to the principles of the present application.

Referring now to FIG. 2, a functional block diagram of an example architecture 200 of the hybrid controller 140 or HCP according to the principles of the present application is illustrated. As shown, the hybrid controller 140 receives a set of measured system inputs from the sensors 148. It will be appreciated that the hybrid controller 140 could also receive other measurements (not shown) and/or could utilize internally known or modeled parameters. The hybrid controller 140 generally comprises a jerk-based speed profiler 204, a closed-loop speed observer 208, and a torque command generator. The jerk-based speed profiler 204 receives as input (i) a target engine speed, (ii) hybrid powertrain constraints (e.g., torque and/or power limits), and (iii) desired acceleration calibrations (e.g., jerk limits, such as minimum and maximum acceptable jerk values). The jerk-based speed profiler 204 utilizes the unique Equations (1) and (2) described in greater detail below to generate an open-loop acceleration command (A) and a profiled target speed, which is based on a calculated number of "loops to converge," or "LTC," to achieve the target engine speed and other input(s). Based on the profiled target speed and the measured engine and electric motor speeds, the closed-loop speed observer 208 determines a closed-loop torque adjustment. Lastly, based on the open-loop acceleration command and the closed-loop torque adjustment, the torque command generator 212 determine engine and electric motor torque commands for the engine controller 132 and the motor controller(s) 136 to use in controlling the engine 116 and the electric motor(s) 120, respectively.

To solve these the above-mentioned design constraints and drawbacks of conventional speed control techniques, a new way to profile is developed and proposed herein. These problems are solved in two main ways. First, convergence on target speed is accomplished through the use of "jerk limits," named for the derivative of acceleration. More specifically, the derivative of position equals speed, the derivative of speed equals acceleration, and the derivative of acceleration equals jerk. Electric motor slew limits (Newton-meters per second, or Nm/s) are converted to jerk limits (RPM per second per second, or RPM/s/s) through a constant based on system inertia (i.e., torque equals inertia multiplied by acceleration). The profiler math (see below) is derived using these limits. The application and derivation of these limits is a mathematically novel approach to these problems. The derivation also considered changing target speed through the use of a target acceleration parameter. This consideration makes it more difficult to derive the limits and is part of this novel approach to these problems. The derivation intends to find the critical acceleration at each moment in time where the system can increase acceleration or decrease acceleration within the system jerk limits. The core Equations (1) and (2) below are derived based on integrating from jerk to acceleration and to speed.

The discrete time solution chosen herein uses a mathematical sequence called "Triangular Numbers." The application of Triangular Numbers to engine speed control is novel. By using this critical acceleration, the system can critically arrive at a target speed changing with a target acceleration. This solves the design problems discussed in detail above. As implemented in the hybrid controller 140 or HCP software, the critical acceleration value at each moment in time is found based on the jerk limit calibration (from electric motor slew limit), target speed, target acceleration, current speed, and time step for the discrete hybrid controller 140 or HCP doing these calculations. This critical acceleration is then converted to an open-loop torque command via a constant based on system inertia and is integrated to arrive at the profiled speed target for the closed loop controller. As previously mentioned, the Equations (1) and (2) for generating the open-loop acceleration command and the profiled target speed or LTC are as follows:

$$A = \frac{N_{tgt} - N_{prof\_prev} - \dot{N}_{tgt} \times dT}{LTC \times dT} + \dot{N}_{tgt} - \frac{J(LTC - 1) \times dT}{2}, \quad (1)$$

where $$LTC = \max\left(1, \left\lceil \frac{1}{2}\left(\sqrt{8\left|\frac{N_{tgt} - N_{prof\_prev} - \dot{N}_{tgt} \times dT}{J \times dT \times dT}\right| + 1} - 1\right)\right\rceil\right) \quad (2)$$

and where A represents acceleration or the open-loop acceleration command, $N_{tgt}$ represents the target speed and $\dot{N}_{tgt}$ represents the change (e.g., instantaneous change) in the target speed (e.g., a dynamically changing target speed), $N_{prot\_prev}$ represents the previously profiled target speed, LTC represents a number of LTC or the profiled target speed, J represents the jerk limit(s), and t represents time or a product of LTC and a time step (dT).

Figure 3:
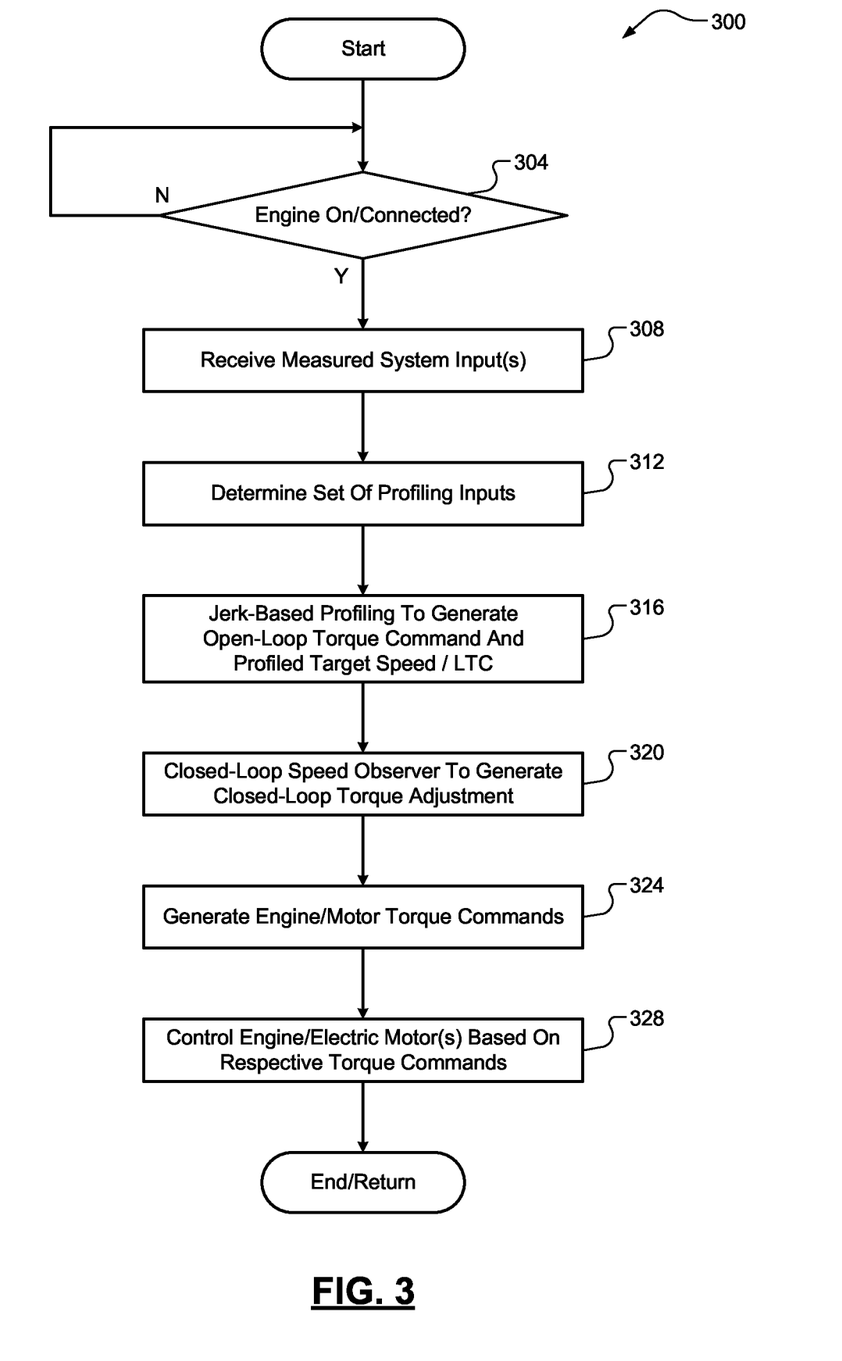
FIG. 3 is a flow diagram of an example hybrid powertrain speed control method for a hybrid vehicle according to the principles of the present application.

Referring now to FIG. 3, a flow diagram of an example hybrid powertrain speed control method 300 for a hybrid vehicle according to the principles of the present application is illustrated. While the components of hybrid vehicle 100 are referenced herein for illustrative purposes, it will be appreciated that the speed control method 300 could be applicable to any suitable hybrid powertrain configuration, as well as to other non-hybrid vehicle applications (e.g., target speed profiling for any rotating machine or system of machines). At 304, the hybrid controller 140 determines whether the engine 116 is on/running and connected or coupled to the non-ETC transmission 124. When true, the method 300 proceeds to 308. Otherwise, the method 300 ends or returns to 304. At 308, the hybrid controller 140 receives the set of measured system inputs from the sensors 148 and/or other sources. At 312, the hybrid controller 140 determines a set of profiling inputs including (i) the target engine speed, (ii) the set of hybrid powertrain constraints, and (iii) the set of desired acceleration calibrations, based on at least the set of target speed input.

At 316, the hybrid controller 140 performs jerk-based profiling to determine an open-loop acceleration command and a profiled target speed, based on the set of profiling inputs. At 320, the hybrid controller 140 determines a closed-loop torque adjustment based on the profiled target speed and the measured engine and electric motor speeds. At 324, the hybrid controller 140 determines engine and electric motor torque commands, based on the open-loop acceleration command and the closed-loop torque adjustment. At 328, the hybrid controller 140 (e.g., via engine controller 132 and motor controller(s) 136) controls the engine and the at least one electric motor 120 based on the respective engine and electric motor torque commands to achieve smooth and quick convergence of the measured engine speed with the target engine speed. The method 300 then ends or returns to 304 for one or more additional cycles.

Figure 4A:
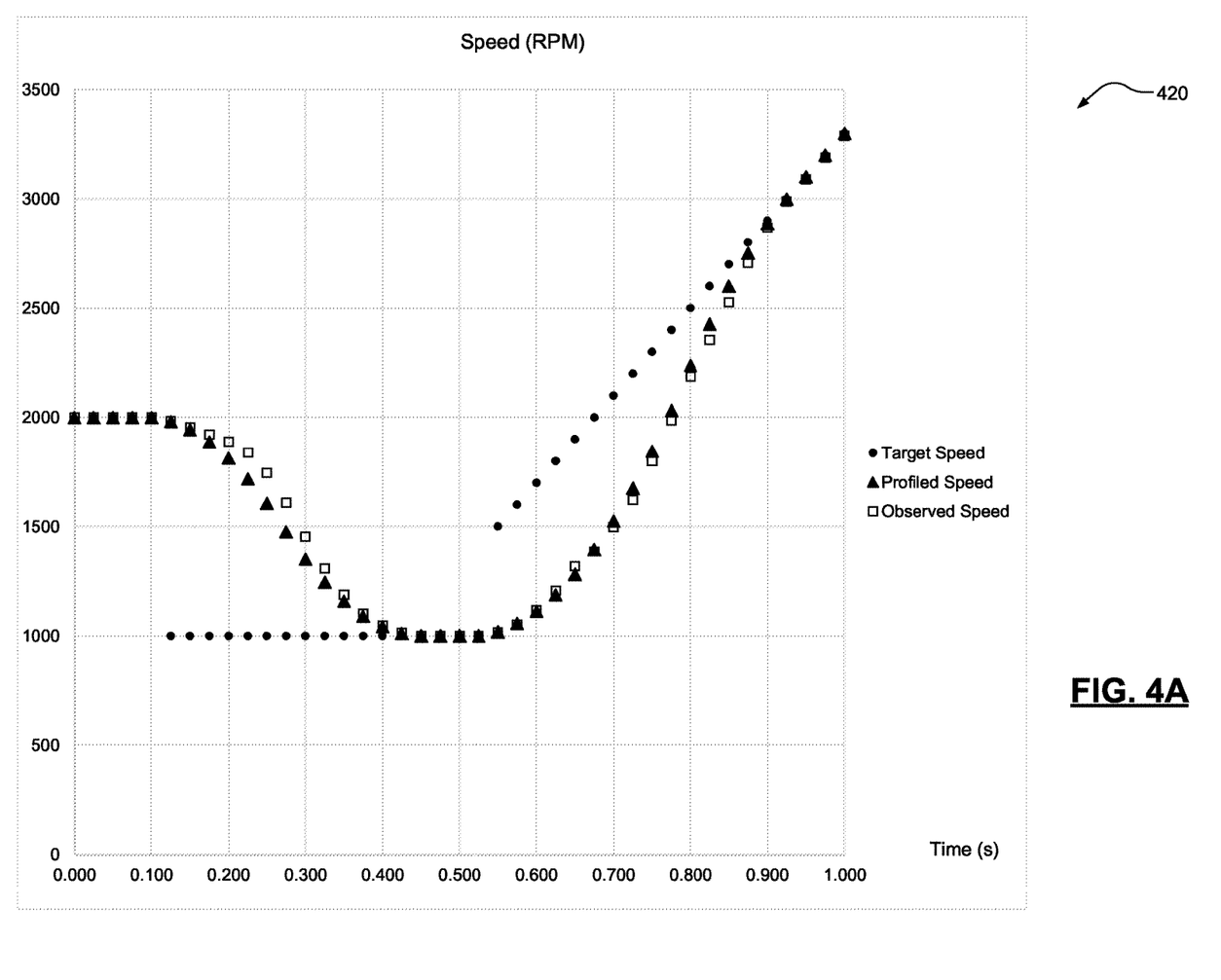
FIGS. 4A-4B are plots of example target and observed engine and profiled target speeds and example target acceleration and jerk limits according to the principles of the present application.
Figure 4B:
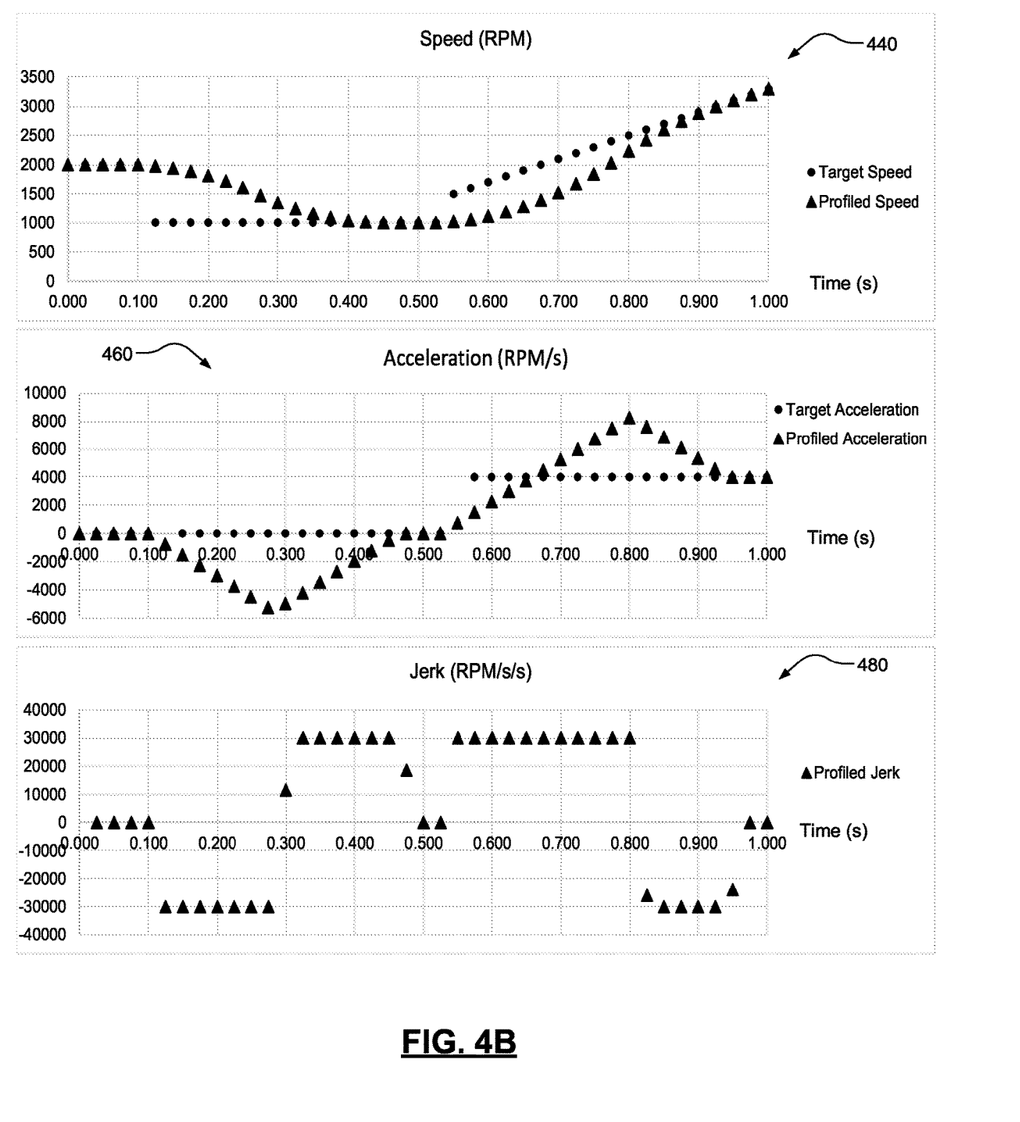

Referring now to FIGS. 4A-4B, plots 420, 440, 460, and 480 of example target and observed engine and profiled target speeds and example target acceleration and jerk limits according to the principles of the present application are illustrated. FIG. 4A generally illustrates a plot of target engine speed, observed engine speed, and profiled target speed in revolutions per minute (RPM) and with respect to time in seconds (s). FIG. 4B, on the other hand, depicts visual representations of the jerk limits critically arriving at target speeds with/without target accelerations.

While a hybrid vehicle and a hybrid powertrain are illustrated and specifically discussed herein, it will be appreciated that the speed control techniques of the present disclosure could be applicable to any rotating system, including a vehicle having one electric motor. For example, even in a hybrid powertrain having an engine and one or two electric motors, there are operating scenarios/periods where only one of the electric motors is operating. When the engine and/or a second electric motor are subsequently enabled/operational, the speed control techniques can slightly vary such that these other moving systems having their own respective rotational speeds are accounted for. In addition, while a conventional non-EVT transmission is illustrated and specifically discussed herein, it will be appreciated that the speed control techniques of the present disclosure could be applicable to EVT transmission applications.

It will be appreciated that the terms "controller" and "control processor" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A speed control system for a vehicle having a powertrain including an electric motor, the speed control system comprising:
   a set of sensors that measure a set of system inputs including (i) a measured speed of the electric motor and (ii) a set of target speed inputs indicative of a target speed for the electric motor; and
   a controller configured to perform a speed control technique including:
   based on at least the set of target speed inputs, determine a set of profiling inputs including (i) the target speed and (ii) a set of desired acceleration calibrations;

based on the set of profiling inputs, perform jerk-based profiling to determine an open-loop acceleration command and a profiled target speed;
based on the profiled target speed and the measured speed of the electric motor, determine a closed-loop torque adjustment;
based on the open-loop acceleration command and the closed-loop torque adjustment, determine an electric motor torque command; and
control the electric motor based on the electric motor torque command.

2. The speed control system of claim 1, wherein the controller is further configured to perform the jerk-based profiling to determine the open-loop acceleration command (A) as follows:

$$A = \frac{N_{tgt} - N_{prof\_prev} - \dot{N}_{tgt} \times dT}{LTC \times dT} + \dot{N}_{tgt} - \frac{J(LTC-1) \times dT}{2},$$

where $N_{tgt}$ represents the target speed, which is dynamically changing, $\dot{N}_{tgt}$ represents the change in the target speed, $N_{prof\_prev}$ represents a previously profiled target speed, LTC represents a number of loops to converge (LTC) to the profiled target speed, J represents the jerk limits, and t represents time or a product of LTC and a time step (dT).

3. The speed control system of claim 2, wherein the controller is further configured to perform the jerk-based profiling to determine the LTC to the profiled target speed as follows:

$$LTC = \max\left(1, \left\lceil \frac{1}{2}\left(\sqrt{8\left|\frac{N_{tgt} - N_{prof\_prev} - \dot{N}_{tgt} \times dT}{J \times dT \times dT}\right| + 1} - 1\right)\right\rceil\right).$$

4. The speed control system of claim 1, wherein the controller is configured to perform the speed control technique continuously during electric motor operation.

5. The speed control system of claim 1, wherein the controller is configured to utilize a closed-loop speed observer to determine the closed-loop torque adjustment based on the profiled target speed and the measured speed of the electric motor.

6. The speed control system of claim 1, wherein the target speed is a dynamically changing target speed and not a stationary target speed.

7. The speed control system of claim 1, wherein the speed control technique is software-based and executable by the controller using the set of sensors and does not require any additional vehicle hardware in addition to the controller and the set of sensors.

8. The speed control system of claim 1, wherein:
the powertrain is a hybrid powertrain comprising a non-electrically variable (non-EVT) transmission having an input shaft connected to a crankshaft of an engine and an output shaft connected to a first axle of a drivetrain of the vehicle;
the set of system inputs further includes a measured speed of the engine and the set of target speed inputs are further indicative of a target speed for the engine; and
the controller is configured to perform the speed control technique further including:
based on at least the set of target speed inputs, determine the set of profiling inputs further including (i) the target of the engine speed and (ii) the set of desired acceleration calibrations;
based on the open-loop acceleration command and the closed-loop torque adjustment, determine an engine torque command; and
control the engine based on the engine torque command.

9. The speed control system of claim 8, wherein:
the hybrid powertrain comprises a first electric motor and a second electric motor;
the first electric motor is connected to the crankshaft of the engine via a belt tensioner; and
the second electric motor is connected directly to the non-EVT transmission and not to the engine.

10. The speed control system of claim 8, wherein:
the hybrid powertrain comprises a first electric motor and a second electric motor;
the first electric motor is connected to the crankshaft of the engine via a belt tensioner; and
the second electric motor is connected directly to a different second axle of the drivetrain of the vehicle and not to the non-EVT transmission or the engine.

11. A speed control method for a vehicle having a powertrain including an electric motor, the speed control method comprising:
receiving, by a controller and from a set of sensors, a measured set of system inputs including (i) a measured speed the electric motor and (ii) a set of target speed inputs indicative a target speed for the electric motor; and
performing, by the controller, a speed control technique including:
based on at least the set of target speed inputs, determining a set of profiling inputs including (i) the target speed and (ii) a set of desired acceleration calibrations;
based on the set of profiling inputs, performing jerk-based profiling to determine an open-loop acceleration command and a profiled target speed;
based on the profiled target speed and the measured speed of the electric motor, determining a closed-loop torque adjustment;
based on the open-loop acceleration command and the closed-loop torque adjustment, determining an electric motor torque command; and
controlling the electric motor based on the electric motor torque command.

12. The speed control method of claim 11, wherein the jerk-based profiling to determine the open-loop acceleration command (A) is performed by the controller as follows:

$$A = \frac{N_{tgt} - N_{prof\_prev} - \dot{N}_{tgt} \times dT}{LTC \times dT} + \dot{N}_{tgt} - \frac{J(LTC-1) \times dT}{2},$$

where $N_{tgt}$ represents the target speed, which is dynamically changing, $\dot{N}_{tgt}$ represents the change in the target speed, $N_{prof\_prev}$ represents a previously profiled target speed, LTC represents a number of loops to converge (LTC) to the profiled target speed, J represents the jerk limits, and t represents time or a product of LTC and a time step (dT).

13. The speed control method of claim 12, wherein the jerk-based profiling to determine the LTC to the profiled target speed is performed by the controller as follows:

$$LTC = \max\left(1, \left|\frac{1}{2}\left(\sqrt{8\left|\frac{N_{tgt} - N_{prof\_prev} - \dot{N}_{tgt} \times dT}{J \times dT \times dT}\right| + 1} - 1\right)\right|\right).$$

14. The speed control method of claim 11, the speed control technique is performed by the controller continuously during electric motor operation.

15. The speed control method of claim 11, wherein a closed-loop speed observer is utilized by the controller to determine the closed-loop torque adjustment based on the profiled target speed and the measured speed of the electric motor.

16. The speed control method of claim 11, wherein the target speed is a dynamically changing target speed and not a stationary target speed.

17. The speed control method of claim 11, wherein the speed control technique is software-based and executable by the controller using the set of sensors and does not require any additional vehicle hardware in addition to the controller and the set of sensors.

18. The speed control method of claim 11, wherein:
the powertrain is a hybrid powertrain comprising a non-electrically variable (non-EVT) transmission having an input shaft connected to a crankshaft of an engine and an output shaft connected to a first axle of a drivetrain of the vehicle;
the set of system inputs further includes a measured speed of the engine and the set of target speed inputs are further indicative of a target speed for the engine; and
the speed control technique further includes:
based on at least the set of target speed inputs, determine the set of profiling inputs further including (i) the target of the engine speed and (ii) the set of desired acceleration calibrations;
based on the open-loop acceleration command and the closed-loop torque adjustment, determine an engine torque command; and
control the engine based on the engine torque command.

19. The speed control method of claim 18, wherein:
the hybrid powertrain comprises a first electric motor and a second electric motor;
the first electric motor is connected to the crankshaft of the engine via a belt tensioner; and
the second electric motor is connected directly to the non-EVT transmission and not to the engine.

20. The speed control method of claim 18, wherein:
the hybrid powertrain comprises a first electric motor and a second electric motor;
the first electric motor is connected to the crankshaft of the engine via a belt tensioner; and
the second electric motor is connected directly to a different second axle of the drivetrain of the vehicle and not to the non-EVT transmission or the engine.

* * * * *